3,056,788
CATALYTIC SYNTHESIS OF
TRIETHYLENEDIAMINE
Walter H. Brader, Jr., Austin, Tex., assignor to Jefferson Chemical Company, Inc., Houston, Tex., a corporation of Delaware
No Drawing. Filed May 18, 1961, Ser. No. 110,891
4 Claims. (Cl. 260—268)

This invention relates to a method for the catalytic synthesis of a heterocyclic compound. More particularly, the present invention is directed to a method for the catalytic preparation of 1,4-diazabicyclo-(2.2.2)-octane, hereinafter referred to as triethylenediamine.

Numerous attempts have been made to prepare triethylenediamine in good yield. See, for example, Herrick United States Patent No. 2,937,176, entitled "Preparation of Diazabicyclo-octane." Past results, however, have left much to be desired, particularly with respect to yield.

It has now been discovered that ethyleneamines are converted in the presence of the catalyst comprising tungsten with good yields of triethylenediamine.

The feed materials for the present invention are aliphatic amines containing 4 to 8 carbon atoms and amine groups separated from each other by 2 carbon atoms, as defined, for example, by the formula:

$$H_2N-CH_2-CH_2-R$$

wherein R is:

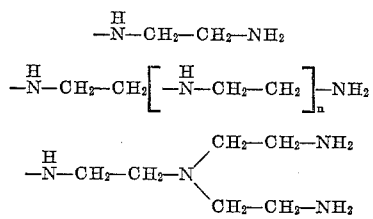

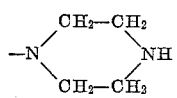

or

where $n$ is 1 or 2.

Representative compounds of this class that can be used alone or in admixture include aminoethylpiperazine, diethylenetriamine, triethylenetetramine and tetraethylenepentamine. The best results are ordinarily obtainable with a feed stock comprising aminoethylpiperazine. A suitable source of aminoethylpiperazine, for example, is a concentrate boiling within the range of about 170° to about 220° C. obtained by the distillation of a reaction produce prepared by the reductive amination in the presence of a metalliferous hydrogenation catalyst, of a compound having the formula:

$$R'-CH_2-CH_2-R$$

wherein: R' is $-NH_2$ or $-OH$; and R is $-NH_2$, $-OH$, or $-(NH-CH_2CN_2)_n-R'$, where $n=1-3$.

The catalyst of the present invention is a substantially silica-free catalyst comprising tungsten. More particularly, a preferred catalyst will comprise from about 10–100 wt. percent of tungsten oxide, the remainder of the material being a substantially silica-free solid support such as alumina, etc.

Although the reaction may be conducted in either liquid phase or vapor phase, the best results are obtained with a vapor phase reaction.

Thus, by way of example, the reaction temperature may be within the range of about 300° to 500° C. and the reaction pressure may be within the range of about 0.1 to about 100 atmospheres.

The space velocity is preferably within the range of about 0.1 to about 4 pounds of feed per pound of catalyst per hour. However, because of the exothermic nature of the reaction, higher space velocities should be used only where appropriate facilities are provided for heat removal.

In accordance with one form of the present invention, the reaction is conducted in the presence of a normally liquid or normally gaseous diluent, or both, such as ammonia, hydrogen, water, $C_1$ to $C_{10}$ aliphatic or aromatic hydrocarbons, etc., or a mixture thereof.

When a normally gaseous diluent is employed, the feed rate will preferably be within the range of about 10 to 1,000 liters of normally gaseous diluent per hour per pound of catalyst, and more preferably within the range of about 100 to 200 liters per hour per pound of catalyst.

When a normally liquid diluent is employed, the feed mixture will preferably comprise from about 10 to 90 wt. percent of N-aminoethylpiperazine, the remainder being diluent.

When the feed stock is passed over a catalyst, the following reactions occur: cyclization to form triethylenediamine, condensation to a high boiling residue, and cracking to form lighter products (e.g., cracking of N-aminoethylpiperazine) to form piperazine, N-alkylpiperazines and N,N'-dialkylpiperazines. The N-alkylpiperazines and N,N'-dialkylpiperazines boil near triethylenediamine and make the triethylenediamine purification difficult. Thus, any method of reducing the yield of these substituted-piperazines will serve to improve the overall yields of triethylenediamine.

Any suitable recovery method may be used. For example, the first step in a triethylenediamine purification may be carried out by distilling the reactor effluent into fractions which boil: (1) Start to 150° C., (2) 150–190° C., and (3) 190–221° C. In addition to triethylenediamine, fraction No. 2, the triethylenediamine rich fraction, will contain piperazine, the N-alkylpiperazines and N,N'-dialkylpiperazines. The extent to which the triethylenediamine can be purified by a final fractionation will depend upon the yield of N-alkylpiperazines and N,N'-dialkylpiperazins. In accordance with the present invention, the yield of substituted-piperazines in the triethylenediamine fraction is significantly reduced.

Table I shows the yield of substituted-piperazines and of triethylenediamine that occur in the triethylenediamine fraction using two different catalysts.

TABLE I

| Catalyst | Substituted Piperazines, Wt. Percent | Triethylenediamine, wt. Percent |
|---|---|---|
| Silica-Alumina | 7.1 | 30 |
| 10% Tungsten Oxide on Silica-Free Alumina | 3.9 | 18 |

Although the yield of triethylenediamine is lower when the tungsten oxide is the catalyst, the yield of the difficult to separate substituted piperazines is some 3.2% less. Thus, the final purification of triethylenediamine will be simpler using the tungsten oxide catalyst because the fraction contains almost 50% fewer impurities.

The invention will be further illustrated by the following specific examples which are given by way of illustration and not as limitations on the scope of this invention. Where parts are given, they are parts by weight.

EXAMPLE I

A feed stock consisting essentially of N-aminoethylpiperazine was passed over a granular catalyst comprising about 10 wt. percent of tungsten oxide supported on essentially silica-free gamma-alumina containing less than 0.05% silica at a temperature of about 405° C. and a pressure of about 105 mm. of mercury at a space velocity of about 1.4 pounds of feed per pound of catalyst per hour.

The reaction product was analyzed after collection, and yields were determined based upon the wt. percent of unrecovered aminoethylpiperazine.

It was found that the conversion of the feed stock was about 87 wt. percent, that about 20 wt. percent of the conversion products represented a residue fraction boiling above aminoethylpiperazine, that about 64 wt. percent of the conversion products were cracked products, and, surprisingly, that about 15.5 wt. percent of the conversion product was triethylenediamine.

EXAMPLE II

Repeat Example I, but in this instance utilize pure gamma-alumina as the solid material. In a representative run, a conversion of 78% was obtained, of which 32 wt. percent is residue, 64 wt. percent was cracked products and about 4.2 wt. percent was triethylenediamine.

EXAMPLE III

Substitute a catalyst consisting of 10 wt. percent tungsten oxide supported on silica-alumina containing about 1 wt. percent silica for the catalyst of Example I. When Example I was repeated at 360° C., conversion was 93 wt. percent based on the feed; 24 wt. percent of the conversion products being residue; 67 wt. percent being cracked products and only 8.8 wt. percent being triethylenediamine.

At 340° C., conversion was 68 wt. percent based on the feed and the conversion products comprised 32 wt. percent residue, 59.3 wt. percent cracked products and, again, only 8.7 wt. percent triethylendiamine.

This example illustrates the adverse effect of silica on triethylenediamine yield and demonstrates that the yield of this product will be lower for a given feed stock if the tungsten oxide catalyst contains silica.

EXAMPLE IV

Pass the feed stock of Example I over a catalytic material consisting essentially of molybdenum oxide at a temperature of about 350° C., a pressure of about 105 mm. of mercury and a space velocity of about 2.2 pounds of feed per hour per pound of catalyst. In a representative run, the conversion was about 59%; the conversion products comprising about 24 wt. percent residue, about 75 wt. percent cracked products and only about 0.5 wt. percent triethylenediamine.

EXAMPLE V

In order to illustrate the effect of temperature on triethylenediamine yield, aminoethylpiperazine was passed over the tungsten-oxide catalyst of Example I at a variety of temperature conditions. The reaction conditions employed and the results obtained are set forth in Table II.

TABLE II

*Effect of Temperature on Triethylenediamine Yield*

| Run | Temperature, °C. | Pressure, mm. Hg | Space Velocity #fd./hr./# cat. | Conversion, Percent | Wt. Percent Distribution of Converted Products | | |
|---|---|---|---|---|---|---|---|
| | | | | | Triethylene-diamine | Residue | Cracking |
| 1 | 310 | 160 | 1.31 | 24 | 5.7 | 28 | 67 |
| 2 | 300 | 90 | 0.6 | 81 | 13.6 | 25 | 61 |
| 3 | 360 | 120 | 1.53 | 69 | 18.0 | 22 | 60 |
| 4 | 400 | 95 | 1.53 | 87 | 15.5 | 20 | 64 |

The results show that the best yields were obtained at about 360° C., and also show that lower space velocities are preferred because of the exothermic nature of the reaction.

EXAMPLE VI

Amioethylpiperazine was passed over a catalyst consisting essentially of tungsten oxide at a temperature of about 360° C., a pressure of about 115 mm. of mercury and a space velocity of about 1.3 pounds of feed per hour per pound of catalyst. The conversion was about 69 wt. percent; 22 wt. percent of the conversion products being residue; 60 wt. percent of the conversion products being light catalytically cracked products, and 18 wt. percent of the conversion products being triethylenediamine. In this particular case, about 45 wt. percent of the cracked product was piperazine.

EXAMPLE VII

Pass the feed stock of Example VI over a silica-alumina catalyst containing about 12 wt. percent alumina and about 86 wt. percent silica at a temperature of about 360° C., a pressure of about 115 mm. of mercury and a space velocity of about 2.59 pounds of feed per hour per pound of catalyst. The conversion was about 66%; the conversion products comprising about 30 wt. percent residue, about 40 wt. percent cracked products and about 30 wt. percent triethylenediamine. About 25 wt. percent of the cracked products was piperazine.

EXAMPLE VIII

Diethylenetriamine was passed over a catalyst consisting essentially of tungsten oxide at a temperature of 360° C., atmospheric pressure, and a space velocity of 1.44 pounds per hour per pound of catalyst. The conversion was 96 wt. percent; 33 wt. percent of the product was residue, 62 wt. percent was cracked product and 4.9 wt. percent was triethylenediamine. About 12 wt. percent of the cracked products was piperazine and 14 wt. percent was ethylenediamine.

EXAMPLE IX

Triethylenetetramine was passed over a catalyst consisting essentially of tungsten oxide at a temperature of 360° C., atmospheric pressure, and a space velocity of 1.44 pounds per hour per pound of catalyst. The conversion was 96 wt. percent; 37 wt. percent of the product was residue, 58% was cracked products and 4.6% was triethylenediamine. About 9 wt. percent of the cracked products was piperazine.

Having described my invention, what is claimed is:

1. In a method for the preparation of triethylenediamine by the catalytic conversion of a N-aminoethylpiperazine, the improvement which comprises contacting said N-aminoethylpiperazine feed stock with a solid substantially completely silica-free tungsten catalyst at a temperature within the range of about 300° to about 500° C. and a pressure within the range of about 0.1 to about 100 atmospheres and recovering triethylenediamine from the products of the reaction.

2. The method as in claim 1 wherein the catalyst comprises tungsten oxide.

3. A method which comprises the steps of contacting a catalyst comprising about 10 to 100 wt. percent of essentially silica-free tungsten oxide with a N-aminoethylpiperazine at a temperature within the range of about 300° to 500° C., a pressure within the range of about 0.1 to about 100 p.s.i.g. and a space velocity within the range of about 0.1 to 4 pounds of feed per pound of catalyst per hour to convert a portion of said N-aminoethylpiperazine to triethylenediamine and recovering said triethylenediamine.

4. A method as in claim 3 wherein the temperature is within the range of about 340° to about 440° C.

References Cited in the file of this patent

UNITED STATES PATENTS 2,937,176    Herrick    May 17, 1960